Dec. 24, 1957     T. C. HILL     2,817,483
AIRCRAFT CONTROL FORCE MODIFIER
Filed Oct. 17, 1951
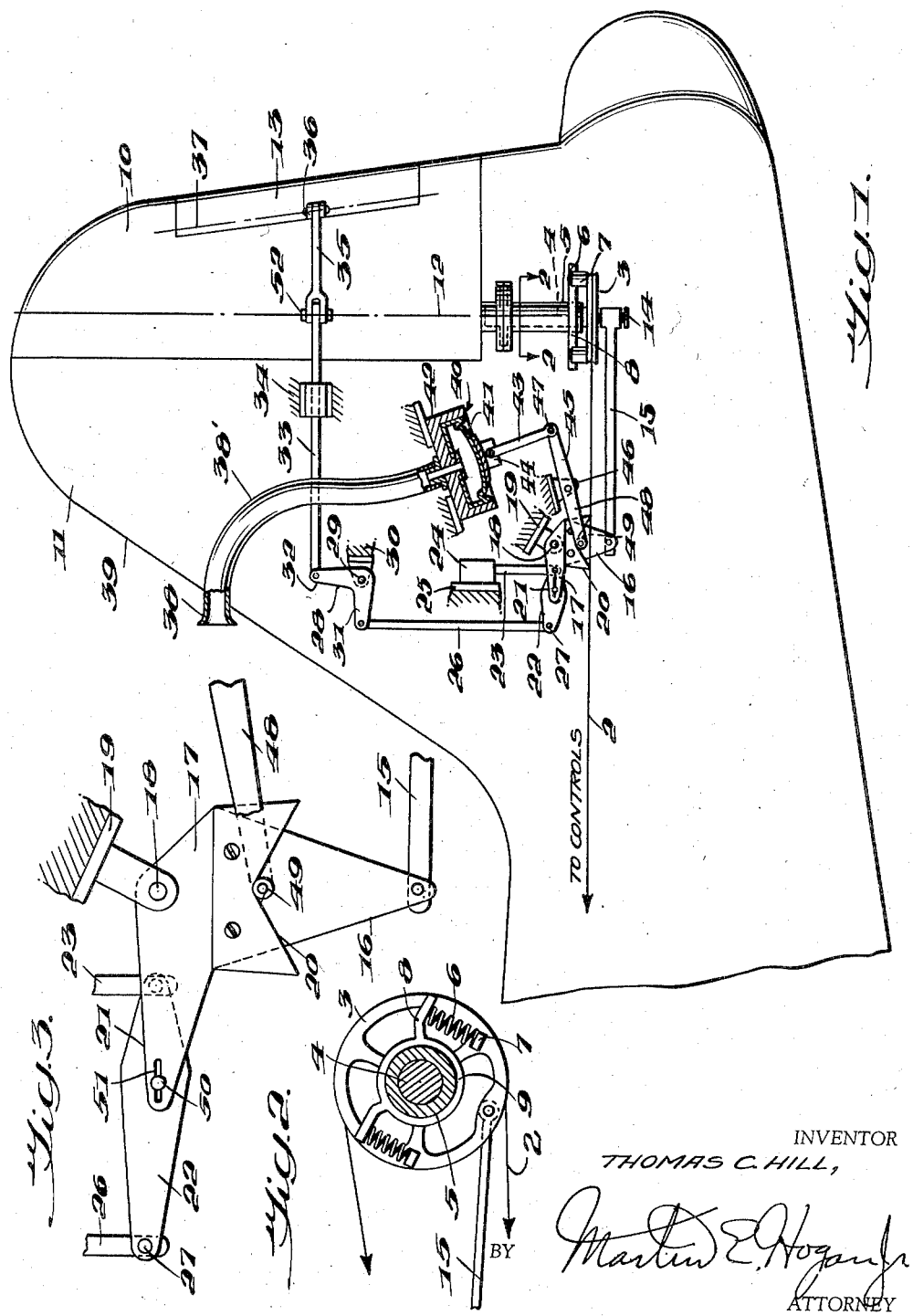
INVENTOR
*THOMAS C. HILL,*
BY
ATTORNEY United States Patent Office 2,817,483
Patented Dec. 24, 1957

2,817,483

AIRCRAFT CONTROL FORCE MODIFIER

Thomas C. Hill, Harford County, Md., assignor to The Glenn L. Martin Company, Middle River, Md., a corporation of Maryland Application October 17, 1951, Serial No. 251,654

3 Claims. (Cl. 244—82)

This invention relates to aircraft and more specifically to an arrangement for modifying the control forces required to maneuver such craft.

It has always been a difficult design problem to obtain the proper control forces throughout the speed range of an aircraft. This is particularly true of the high-speed types since the force applied to the control surface for a given deflection varies directly with the dynamic pressure or the airspeed squared. Obviously then, the control force variations may be quite large unless modified in the actuating system. If the control forces are too great, the pilot will be unable to control the aircraft and if the control forces are too low excessive control surface deflections may be produced which will overload the control surface and cause it to fail. The forces should be such that a given force will produce a given rate of change of position of the aircraft.

The conventional devices such as tabs used to modify control forces in aircraft are generally not capable, by themselves, of properly modifying the control forces for all the required surface deflections and speed ranges.

With this invention, ram air pressure developed by the forward motion of the aircraft is employed advantageously to either reduce or increase the control forces by an amount varying as a function of airspeed, through the use of a cam in the actuating linkage as hereinafter described in detail in this specification.

An object of this invention is to provide a simple and dependable control force modifier for an aircraft which will enable one to maintain proper control forces for all speeds and all control surface deflections.

Another object of this invention is to provide a control force modifier which is readily adaptable to use even as a service installation on existing aircraft.

Further and other objects will become apparent from the accompanying description and drawings which form a part of this disclosure and in which like numerals refer to like parts.

In the drawing:

Figure 1 shows schematically the control force modifier of this invention employed in conjunction with a rudder tab on the tail portion of an aircraft.

Figure 2 is a sectional view taken on line 2—2 of Figure 1.

Figure 3 is an enlarged view of a portion of the actuating linkage shown in Fig. 1.

For purposes of illustration, the control force modifier of this invention is shown schematically in Fig. 1 as a part of a particular rudder control system in an aircraft although it is obvious equally well adaptable to other rudder control systems as well as to control systems for ailerons, elevators, etc. A control cable 2 extending from the pilot's compartment (not shown) engages a cable quadrant 3 rotatably carried by rudder post 5 through shaft 4 for actuating the rudder control mechanism. A pair of compression springs 6 are carried between bracket members 7, fixedly attached to cable quadrant 3, and arms 8, forming a part of collar 9 fixedly attached to rudder post 5 as best shown in Fig. 2, so as to permit limited relative rotational movement between cable quadrant 4 and the rudder post. Rudder 10, carried on the trailing edge portion of the vertical fin 11 is adapted to pivot about its hinge line 12 in accordance with the pivotal movement of rudder post 5. A combination servo and trim tab 13 is carried in the trailing edge portion of rubber 10 for both trimming the aircraft and reducing the control forces required to deflect the rudder when maneuvering.

Tab 13 is actuated through a linkage connecting with cable quadrant 3 through a crank pin 14 offset from the axis of rotation of the cable quadrant. As shown schematically, this linkage includes a pitman rod 15 connecting at one end to crank pin 14 and at its opposite end to one arm 16 of a bell crank 17 which is pivotally carried at 18 by a bracket 19 forming a part of the aircraft structure. As best shown in Fig. 3, bell crank 17 includes a cam 20 fixedly attached thereto for use as described later on in this specification. The other arm 21 of bell crank 17 pivotally connects with a trim lever 22 through a pin 50 and slot 51 arrangement. One end of trim lever 22 is pivotally carried by an axially adjustable member 23 forming a part of the trim actuator 24 which is rigidly carried by bracket 25. The opposite end of trim lever 22 pivotally connects with rod 26 through pin 27. A second bell crank 28 is pivotally carried by pin 29 on fixed bracket 30, one arm 31 of bell crank 28 being pivotally connected with rod 26 and the other arm 32 being pivotally connected with actuator rod 33. Rod 33 is supported by suitable means such as bracket 34 within the fin structure 11. Rod 33 pivotally connects with a tab control arm 35 through pin 52 located approximately on the rudder hinge line 12. Tab control arm 35 pivotally connects with a bracket 36 extending generally normal to the plane of the rudder surface on tab 13 so that axial movement of rudder control arm 35 will produce rotation of tab 13 about its hinge line 37.

A ram air inlet 38 is formed in the leading edge 39 of fin 11 so as to receive ram air. Inlet 38 communicates with a pressure responsive means 40 through conduit 38'. As shown in Fig. 1, pressure responsive means 40 may be simply a diaphragm 41 secured to one end of a housing 42 adapted to receive ram air through conduit 38'. A link 43 pivotally connects with diaphragm 41 through bracket 44 so that as ram air pressure applies a force on the diaphragm, that force is transmitted to the link. A rocker arm 45 pivotally carried by bracket 46 connects with link 43 through pin 47. The free end 48 of rocker arm 45 carries a cam follower 49 which is adapted to seat cam 20 on bell crank 17 and apply a force thereto proportional to the pressure in diaphragm 40.

Operation of the rudder is controlled by moving cable 2 in the appropriate direction so as to rotate cable quadrant 3. As this is done, rudder 10 is caused to pivot a certain amount about its hinge line through the action of compression springs 6 carried between rudder post 5 and the cable quadrant, the amount of rotation depending upon the rudder's resistance to rotation which is of course a function of airspeed. As cable quadrant 3 is rotated, pitman rod 15 is also caused to move in a generally axial direction causing bell crank 17 to pivot about pin 18 so as to move arm 26. Movement of arm 26 in turn causes corresponding movement of actuator rod 33 through bell crank 28. As actuator rod 33 moves axially, tab control arm 35 is caused to move so as to deflect tab 13. As the air strikes the deflected tab a moment is produced about the rudder hinge line 12 tending to rotate the rudder in the same direction as does the rotational force applied to rudder post 5 through cable quadrant 3.

Since the magnitude of ram air pressure is directly proportional to the airspeed squared, the pressure within the pressure responsive means 40 is relatively low at low speeds and increases very rapidly at high speeds. This variation in ram air pressure is ideal for providing energy to modify the control forces at high speeds when the rudder movements become most difficult and critical. This ram air pressure as applied to diaphragm 41 tends to move rocker arm 45 in a clockwise direction about its pivot on bracket 46 so as to exert a force on cam 20 through cam follower 49. The force exerted on cam 20 by cam follower 49 is proportional to the ram air energy in the pressure responsive means. Thus as bell crank 17 is pivoted about pin 18 cam follower 49 rides up on cam 20 so as to exert a force tending to return bell crank 17 to its original neutral position, the force tending to return it depending upon the shape of the cam and the airspeed. By judiciously shaping cam 20, the control forces may be modified as desired over the entire range of rudder deflection settings.

Though the cam shape as shown in Figures 1 and 3 is adapted to increase the control forces so as to prevent excessive rudder deflections due to too low a control force at high speeds, it is obvious that the cam shape could be inverted so as to reduce the control forces equally as well.

In addition to tab 13 being used as a servo tab to reduce the control forces required to deflect the rudder, it may also be used as a trimming tab by employing lever 22 as shown in Fig. 1. By simply moving member 23 axially through operation of trim actuator 24, the rotational position of tab 13 about its hinge line 37 may be controlled completely independently of the servo tab function. If the trimming device were not desired, obviously it would be a very simple matter to remove lever 22 and connect arm 26 directly to bell crank 17.

Though the invention has been described as forming a part of the actuating linkage for an aircraft rudder, it is obviously equally well suited for use in other aircraft control systems with or without the use of tabs.

It is to be understood that certain changes, alterations, modifications and substitutions can be made without departing from the spirit and scope of the appended claims.

I claim as my invention:

1. In an aircraft having an aerodynamic control surface swingably carried thereon, and a tab swingably carried by said control surface, an actuating mechanism secured thereto for controlling the swinging movements of said control surface and tab comprising, a rotatable member carried by said aircraft, a spring connecting with said rotatable member and said control surface urging said control surface to move in accordance with the movement of said rotatable member, a tab control linkage connecting said rotatable member and said tab for moving said tab in accordance with the movement of said rotatable member for assisting movement of said control surface, said tab control linkage including a cam, said aircraft having an opening formed therein adapted to receive ram air, pressure responsive means communicating with said opening, and a cam follower carried by said pressure responsive means and engaging said cam, so constructed and arranged as to apply a force on said tab control linkage proportional to the magnitude of the ram air pressure, said cam being so shaped that the force exerted by said cam follower, when said control surface is out of its neutral position, tends to actuate said linkage.

2. In an aircraft having an aerodynamic control surface swingably carried thereon, and a tab swingably carried by said control surface, an actuating mechanism secured thereto for controlling the swinging movements of said control surface and tab comprising, a pilot-operated cable-controlled rotatable member carried by said aircraft, a resilient means connecting said rotatable member and said control surface urging said control surface to move in accordance with the movement of said rotatable member, a tab control linkage connecting said rotatable member and said tab for moving said tab in accordance with the movement of said rotatable member for assisting movement of said control surface, said tab control linkage including a cam, said aircraft having an opening formed therein adapted to receive ram air, pressure responsive means communicating with said opening, and a cam follower carried by said pressure responsive means and engaging said cam, so constructed and arranged as to apply a force on said tab control linkage proportional to the magnitude of the ram air pressure, said cam being so shaped that the force exerted by said cam follower, when said control surface is out of its neutral position, tends to actuate said linkage.

3. A control force modifier for an aircraft having an aerodynamic control surface swingably carried thereon comprising, a tab swingably carried by said control surface, an actuating mechanism secured to said tab for controlling the swinging movements of said control surface and tab comprising, a control cable-actuated rotatable member carried by said aircraft, a resilient means connecting with said rotatable member and said control surface urging said control surface to move in accordance with the movement of said rotatable member, a tab control linkage connecting said rotatable member and said tab for moving said tab in accordance with the movement of said rotatable member for assisting movement of said control surface, said tab control linkage including a cam, said aircraft having an opening formed therein adapted to receive ram air, pressure responsive means communicating with said opening, and a cam follower carried by said pressure responsive means and engaging said cam, so constructed and arranged as to apply a force on said tab control linkage proportional to the magnitude of the ram air pressure, said cam being so shaped that the force exerted by said cam follower, when said control surface is out of its neutral position, tends to actuate said linkage.

References Cited in the file of this patent

UNITED STATES PATENTS

| | | |
|---|---|---|
| 2,295,159 | Child | Sept. 8, 1942 |
| 2,340,524 | Fischel | Feb. 1, 1944 |
| 2,357,465 | Focht | Sept. 5, 1944 |
| 2,548,481 | Knowler et al. | Apr. 10, 1951 |
| 2,553,694 | Wendt | May 22, 1951 |

FOREIGN PATENTS

| | | |
|---|---|---|
| 569,290 | Great Britain | May 16, 1945 |
| 581,512 | Great Britain | Oct. 15, 1946 |